Patented Nov. 6, 1923.

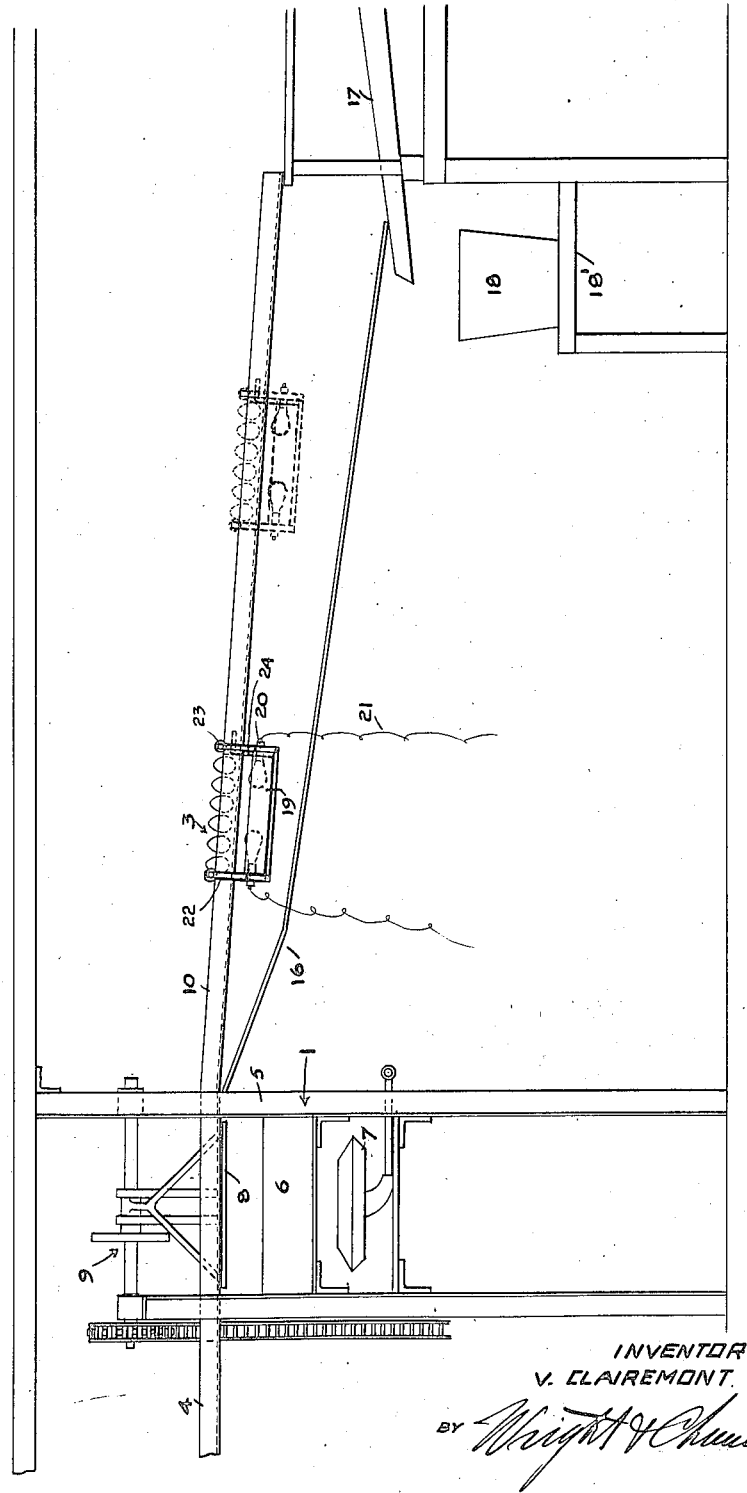

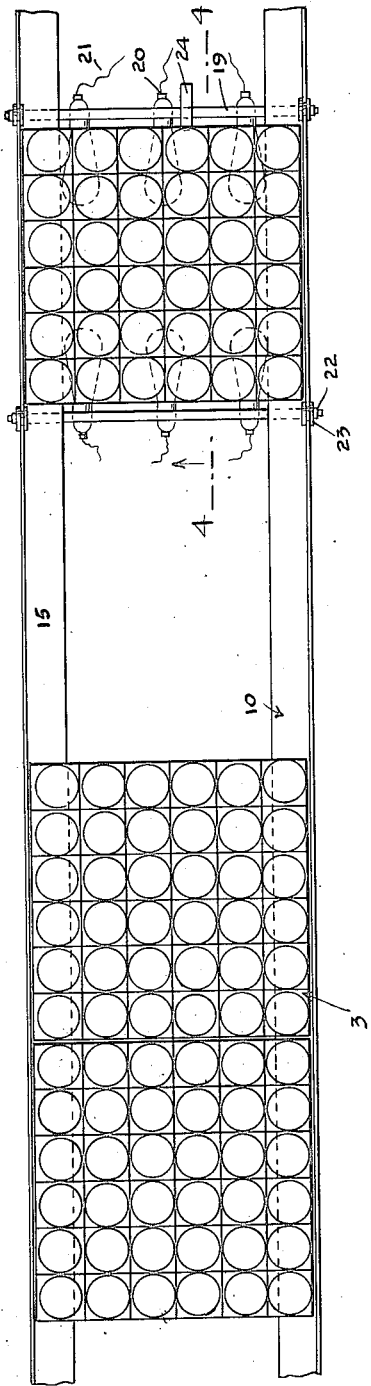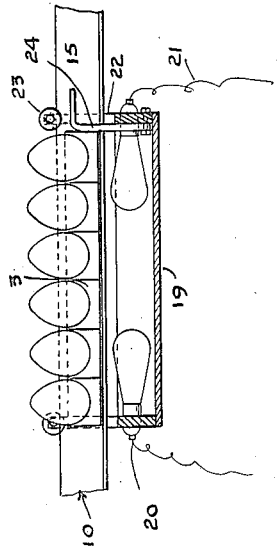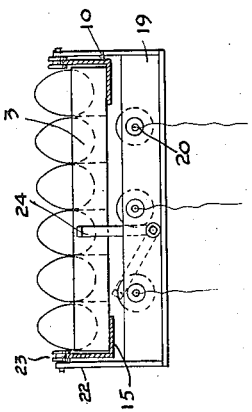

1,473,279

UNITED STATES PATENT OFFICE.

VICTOR CLAIREMONT, OF SAN FRANCISCO, CALIFORNIA.

EGG-CANDLING APPARATUS.

Application filed August 10, 1921. Serial No. 491,143.

*To all whom it may concern:*

Be it known that I, VICTOR CLAIREMONT, a citizen of the United States, residing at San Francisco, in the county of San Francisco and State of California, have invented new and useful Improvements in Egg-Candling Apparatus, of which the following is a specification.

This invention relates to improvements in apparatus for preparing eggs for storage and more particularly to the egg candling apparatus used in connection with such apparatus.

In certain type of machines or apparatus now in use for preserving and candling eggs wherein the trays or baskets of eggs are advanced continuously to and dipped into a preserving solution and are then passed or advanced consecutively on a track, slide or other support from the dipping apparatus to stationary candling apparatus and, also in other egg handling apparatus, where the trays or baskets are fed or advanced along a support to the candling apparatus, the feed or movement of the trays or baskets to the candling apparatus is sometimes too rapid compared to the time required for candling the eggs of each basket. If the candling of the eggs of one tray or basket is prolonged and requires that the tray be held over the candling device for an unusually long period of time, as is often the case, the other baskets or trays being advanced to the candling apparatus will jamb, the advancement thereof will be prevented and the operator at the dipping apparatus will not be able to continue the dipping operation until the necessary room is provided on the track or support on which the baskets are advanced to and from the dipping apparatus. This also interferes with the candling operation. Thus the dipping operation must be stopped until the candling operator "catches up" and advances the baskets from the candling apparatus so as to make room for advancement of incoming baskets to be candled. Since the efficiency of egg handling apparatus of the character described depends mainly on the continuous operation of the mechanism whereby the handling and different treatment of a large quantity of eggs may be continuously and expeditiously carried out, stopping of the operation of the apparatus is obviously an objection and impairs the efficiency of the apparatus.

It is the primary object of this invention to provide means for overcoming the objections hereinbefore noted and I accomplish this thru employment of an improved candling apparatus wherein the candling means is movable along the track or support with the basket or tray of eggs to be candled, instead of being stationary. With the apparatus of my invention as soon as a basket or tray reaches a certain point on the track or support over the candling device, the operator may simultaneously move or advance the tray or basket and candling device along the track and candle the eggs while so moving, say for example, along from ten to thirty feet of the track or better, such distances as is necessary to prevent the advancement of the next or following trays from being interfered with by the trays being candled or, vice versa.

Another object of the invention is to provide improved candling apparatus of the character described which apparatus may be easily installed in the type of apparatus heretofore used without entailing appreciably added expense and which will be simple as to construction, reliable in operation and effect a saving in time and labor.

The invention possesses other advantages and features some of which, with the foregoing will be set forth at length in the following description where I shall outline in full that form of the invention which I have selected for illustration in the drawings accompanying and forming a part of the present specification. In said drawings I have shown one form of the construction of my invention, but it is to be understood that I do not limit myself to such form since the invention as expressed in the claims may be embodied in a plurality of forms.

Referring to the drawings:

Fig. 1 is a fragmentary side elevation of egg handling apparatus showing my invention in connection therewith, the figure being partly in vertical section.

Fig. 2 is a fragmentary top plan view of the candling apparatus showing the manner of use thereof.

Fig. 3 is a cross sectional view taken on line 3—3 of Fig. 2.

Fig. 4 is a cross sectional view taken on line 4—4 of Fig. 2.

Referring to the drawings, 1 designates the dipping or egg preserving device of the apparatus to which baskets or trays 3 of eggs are fed from a track or feeding device 4. The dipping device comprises a suitable support 5 upon which a preserving solution tank 6 is mounted, with a burner 7 beneath the tank so as to heat the solution. A dipping table 8 onto which the trays are advanced is mounted on the support so as to move the eggs into and out of the tank, to immerse the eggs. Suitable means 9 is provided for operating the dipping table. This dipping apparatus as illustrated, is described in detail in Letters Patent of the United States, No. 1,224,711 granted to me May 1, 1917 and need not here be described in detail.

A slightly inclined track or support 10 extends outwardly from one side of the support 5 for from ten to thirty feet, more or less, depending on the size and capacity of the apparatus. The track preferably comprises spaced angle bars 15, the horizontal portions of which slidably support the baskets or trays whereas the vertical portions retain the trays on the tracks. Under the track is a drain pan or trough 16 which catches the solution dripping from the baskets. This pan or trough drains into a trough 17 which in turn drains into a bucket 18 mounted on a support 18'. The track or support is arranged to permit the movement of the trays from the track onto a table 8. At this point the eggs are further treated or handled preparatory to storage thereof.

The candling device is movable with the trays or baskets so that the candling operation may be carried out while the trays are advanced or moved on the tracks or supports.

The candling device is preferably formed as a boxlike enclosure 19, open on its upper side only and supporting illuminating means 20 in the form of incandescent electric lights, to which lights suitable conductors 21 lead. The enclosure 19 is of substantially the same size as the baskets or trays and depends from the track. Arms 22 extend upwardly from the enclosure along the outside of the tracks and carry rollers 23 on their upper ends. The rollers 23 engage upon the upper edges of the rails and thus provide for slidably supporting the candling device.

As a means for causing the candling device to be moved with the tray of eggs to be candled, a stop member 24 is pivoted on the enclosure 19 and is adapted to be swung into position to be engaged by the baskets or trays.

As the eggs are lifted out of the preserving solution an operator stationed at this point advances the tray onto the track or support. Another operator for the candling device may stand at a given point along the track and when the first basket is moved over the candling device, proceed with the candling operation. However, this operator may stand close to the dipping device with the candling device at hand and when the first basket is placed upon the track, cause said basket to be advanced along with and over the candling device, the operator walking along the track or support while candling. If desired, the operator may move the stop member 24 into position to be engaged by the basket or tray and by holding onto the basket or tray, the advancing of the same along the track will cause the candling device to be advanced in proper position to permit of the candling operation. In this way, it will be seen that, where the track is relatively long and the operator is not required to stand in one spot during the candling operation, jamming of the baskets on the track and stopping of the operation will be prevented.

The main point relative the operation of the apparatus is to avoid stopping of either the dipping or candling operation, in other words, to make the entire operation continuous. The operator, in being able to move the baskets and candling device while candling a basket of eggs, may keep just in advance of the oncoming trays of eggs to be candled and in this way prevent stopping of the operation as would be required were the candling device stationary at some one point along the track. Preferably the baskets have egg fillers such as used in ordinary egg containers, placed thereon immediately after the dipping operation, so as to confine the light from the candling apparatus to the eggs and render the candling operation easier and more effective. When the operator uses the stop member 24 to keep the candling device and egg tray in alinement, upon completion of the candling operation, the stop member may be quickly moved out of position in engagement with the tray.

While I have shown a special form of stop member and means for suspending the candling device to provide for moving the same along the track, I do not wish to be limited to these special forms of devices and may use any other means suitable for slidably or movably supporting the basket and for providing for the alinement and simultaneous movement of the candling device and the baskets or trays to be candled.

I claim:

1. In apparatus for candling eggs, a support upon which eggs are movable and illuminating means arranged to move along the support during movement of the eggs and providing for the candling of the eggs during the movement thereof on the support.

2. In candling apparatus, a support comprising spaced supporting members upon which trays or baskets of eggs to be candled are movable and a candling device movable along said support and means on the candling device movable into and out of position to be engaged by the container moving along the support.

3. In candling apparatus comprising a support, an egg container movable on the support, illuminating means movable on the support beneath the container and means of connection between the container and illuminating means providing for simultaneous movement of said container and said illuminating means.

4. The method of candling eggs which consists in placing eggs over illuminating means and continuously moving the eggs and illuminating means in a given direction and candling the eggs during the movement thereof.

5. The method of candling eggs which consists in moving a given number of eggs continuously in one direction causing light rays from illuminating means to follow and impinge upon the eggs during movement thereof and candling the eggs during such movement thereof.

6. Apparatus for candling eggs comprising a track-like support along which egg containers are movable, an egg container movable on the support and illuminating means movable on the support beneath the egg container.

VICTOR CLAIREMONT.